United States Patent [19]
Takeuchi et al.

[11] 3,804,469
[45] Apr. 16, 1974

[54] SKID CONTROL SYSTEM FOR MOTOR VEHICLES

[75] Inventors: Yasuhisa Takeuchi, Yokosuka; Haruhiko Iizuka, Yokohama, both of Japan

[73] Assignee: Nissan Motor Company, Limited, Yokohama City, Japan

[22] Filed: May 15, 1972

[21] Appl. No.: 253,121

[30] Foreign Application Priority Data
Oct. 13, 1971  Japan .............................. 46-80781

[52] U.S. Cl. .............................. 303/21 BE, 303/20
[51] Int. Cl. .............................. B60t 8/10, B60t 8/12
[58] Field of Search ............... 188/181; 303/20, 21; 324/161–162; 340/52 B, 262–263

[56] References Cited
UNITED STATES PATENTS

| | | | |
|---|---|---|---|
| 3,556,610 | 1/1971 | Leiber | 303/21 P |
| 3,614,173 | 10/1971 | Branson | 303/21 P |
| 3,604,761 | 9/1971 | Okamoto et al. | 303/21 BE X |
| 3,640,589 | 2/1972 | Taniguchi | 303/21 BE |
| 3,604,760 | 9/1971 | Atkins | 303/21 BE UX |
| 3,578,819 | 5/1971 | Atkins | 303/21 P |
| 3,653,727 | 4/1972 | Kullberg et al. | 303/21 P |
| 3,672,730 | 6/1972 | Burckhardt et al. | 303/21 BE |

*Primary Examiner*—Duane A. Reger
*Assistant Examiner*—Stephen G. Kunin

[57] ABSTRACT

A method and a system for controlling the skid of a driving wheel or wheels of a motor vehicle are disclosed, in which the velocity of the driving wheel is first sensed so as to provide an approximated vehicle velocity signal and a deceleration or acceleration rate signal. An approximated slip-ratio is computed from both the sensed wheel velocity and the approximated vehicle velocity and is compared with a predetermined slip-ratio signal. Braking pressure is released from the driving wheel during the braking operation if the approximated slip-ratio signal is greater than the predetermined slip-ratio reference signal and concurrently the deceleration-rate is over a predetermined limit. The braking pressure is re-applied to the driving wheel when the deceleration rate decreases below a variable deceleration-rate reference signal which is varied in accordance with the changes in the wheel and road surface conditions in each of the brake re-application cycles.

12 Claims, 7 Drawing Figures

SKID CONTROL SYSTEM FOR MOTOR VEHICLES

The present invention relates generally to motor vehicle braking systems, and, more particularly, to the braking systems of anti-skid characters.

When a motor vehicle cruising at a high speed is braked violently, the braking effort applied to the vehicle wheels overpowers the frictional force produced at the interfaces between the tires and road surface and, as a consequence, the motor vehicle is caused to skid or slide on the road surface with the wheel or wheels locked up. This locked-up condition of the wheel or wheels tends to prevent the vehicle driver to retain the directional control of the motor vehicle and, furthermore, to increase the stopping distance of the motor vehicle. The braking system having a skid control arrangement is thus used to avoid such locked-up condition of the wheel or wheels and consequently to provide assurance of safety when the motor vehicle is braked. The skid control arrangement of a certain known type, in effect, measures the deceleration of the wheel and adjusts the braking effort on the wheel accordingly. When the wheel starts to lock up through being overbraked, the deceleration develops at a high rate and if the deceleration rate is higher than a predetermined level during the impending wheel locking condition, then the skid control arrangement detects the deceleration rate and acts to reduce the working fluid pressure in the wheel cylinder of the braking system. The wheel is consequently permitted to speed up again and, when a predetermined rate of acceleration is reached, the fluid pressure in the wheel cylinder is increased so as to re-apply the brakes. This cycle of operation is repeated a number of times a second as long as the tire is operating on the limit of its adhesion. In the skid control arrangement of this prior art type, the rates of deceleration and acceleration of the wheel are detected by a suitable sensing unit so as to deliver a signal indicative of the sensed deceleration or acceleration rate as the case may be whereupon the braking effort on the wheel is released in accordance with the deceleration-rate signal and re-applied to the wheel in accordance with the acceleration-rate signal. The motor vehicle is in this manner brought to a standstill without completely restraining the driving wheels.

Difficulties are, however, encountered in the skid control arrangement of the above described character in that various changes in the operating conditions of the motor vehicle such as the change in the road surface condition are not minutely followed by the control arrangement during the braking operation. The skid control arrangement is, thus, unable to provide pertinent control over the braking pressure on the wheel so that the risk of the wheel locking is still maintained and the motor vehicle can not be brought to a full stop in a desired stopping distance.

Accordingly, it is an object of the present invention to provide an improved method and a system therefor which are adapted to accurately and reliably controlling the application and release of the brake pressure on the vehicle wheels.

It is another object of the present invention to provide an improved method and a system for preventing skidding of the motor vechile during the braking operation.

It is still another object of the present invention to provide an improved method and a system by which the vehicle wheels of the motor vehicle are prevented from locking up during the braking operation.

It is still another object of the present invention to provide an improved method and a system by which the motor vehicle can be brought to a standstill in a considerably shortened stopping distance during the braking operation.

It is still another object of the present invention to provide an improve method and a system wherein the wheel and road conditions which are subject to change during the braking operation of the motor vehicle are "fed back" to a wheel velocity sensing unit whereby the braking pressure on the driving wheels is regulated in close relation to such varying wheel and road conditions.

It is still another object of the present invention to provide an improved method and a system by which the application and release of the braking pressure on the driving wheels of the motor vehicle are controlled through accurate and proper determination of the mode of control in close relation to the changes in the wheel and road conditions during the braking operation.

It is still another object of the present invention to provide an improved method and a system in which the changeover point of the braking pressure applied and re-applied to the driving wheels is varied in accordance with the wheel and road conditions of the motor vehicle.

The method which is adapted to accomplish these objects of the present invention basically comprises sensing the velocity of the vehicle wheel for producing a wheel-velocity signal, deriving from this wheel-velocity signal a slip-ratio signal representing the ratio of the amount of slippage of the wheel on the road surface vs. the vehicle speed and a velocity-change-rate signal indicative of the rate of change of the sensed wheel velocity, releasing the braking pressure from the wheel when the slip-ratio signal exceeds a predetermined slip-ratio reference signal and simultaneously when the velocity-change-rate signal exceeds a predetermined deceleration-rate reference signal, applying the braking pressure to the wheel when the velocity-change-rate signal is smaller than a variable deceleration-rate signal, and varying the variable deceleration-rate reference signal in accordance with the velocity-change-rate signal in response to acceleration of the wheel. The slip-ratio signal is preferably produced in such a manner that an approximated-vehicle-velocity signal is first derivered from the wheel-velocity signal and then a signal representing the slip ratio is produced which corresponds to the ratio of the difference between the wheel-velocity signal and the approximated-vehicle-velocity signal vs. the approximated-vehicle-velocity signal. The velocity-change-rate signal, on the other hand, is provided through differentiation of the wheel-velocity signal with respect to time, thus indicating the rate of deceleration or acceleration of the driving wheel. For the purpose that the variable deceleration-rate reference signal be varied in accordance with the velocity-change-rate signal in response to acceleration of the driving wheel, a maximum acceleration rate is first compared with two different acceleration-rate reference signals so as to produce a positive control signal when the maximum acceleration rate exceeds the greater one of these acceleration-rate reference signals and a negative control signal when the maximum acceleration rate is smaller than the smaller one of the reference signals. The positive or negative control signal is added to a suitable bias signal, the resultant sum of the two signals providing the variable deceleration-rate reference signal. In this instance, the positive or negative control signal may be of a magnitude which is proportional to the difference between the maximum acceleration-rate signal and acceleration-rate reference signal, thus being of a generally an analog nature. Or otherwise, the control signal may be formed in a digital fashion in which instance the control signal has a predetermined positive or negative magnitude. The bias signal used to deliver the variable deceleration-rate reference signal may be of a constant magnitude or may be the variable deceleration-rate reference signal per se produced in the preceding brake application cycle.

The skid control system adapted to put the above described method into practice generally comprises sensing means for sensing the velocity of at least one vehicle wheel of the motor vehicle and producing the wheel-velocity signal, differentiating means for differentiating the wheel-velocity signal with respect to time and producing the velocity-change-rate signal which is indicative of the rate of change of the sensed wheel velocity, brake release means including computing means for deriving the above-mentioned slip-ratio signal from the wheel-velocity signal, the brake release means being operable to release the braking pressure from the wheel when the slip-ratio signal exceeds a predetermined slip-ratio reference signal and concurrently when the velocity-change-rate signal is greater than a predetermined deceleration-rate reference signal, and brake application control means for applying the braking pressure to the wheel when the velocity-change-rate signal is smaller than a variable deceleration-rate reference signal which is smaller than the aforesaid predetermined deceleration-rate reference signal. The brake application control means includes computing means for varying the variable deceleration-rate reference signal is accordance with the velocity-change-rate signal in response to acceleration of the vehicle wheel.

The nature of the method and system according to the present invention will become more apparent from the following description taken in conjunction with the accompanying drawings in which.

Figure 1:
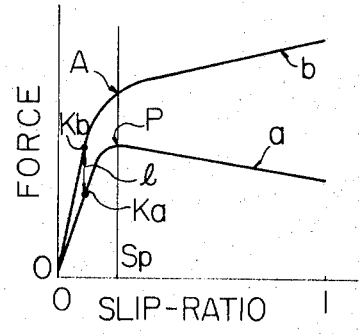
FIG. 1 is a graph showing examples of the variations in driving and braking forces on a motor vehicle in terms of the slip ratio as observed where the skid control is not effected during braking operation.

Referring to FIG. 1, an analysis is first made into the wheel lock-up condition during the braking operation of the motor vehicle. In FIG. 1, the slip ratio S taken on the axis of abscissa is assumed to be a ratio which is expressed as:

$$S = \frac{\text{Vehicle velocity} - \text{Circumferential wheel velocity}}{\text{Vehicle velocity}}.$$

The ordinate represents the driving and braking forces by curves $a$ and $b$, respectively, which are exerted on the motor vehicle when the brakes are being applied on the vehicle wheels without positive control of the braking pressure. The driving force is an effort resulting from the traction from the road surface due to the friction between the wheel and the road surface while the braking force is an effort exerted from the wheel cylinders of the braking system and by the engine during the braking operation. It is thus apparent from the above definition that the slip ratio S is a value intervening between 0 and 1 and that it assumes the value of 0 in the absence of slippage of the wheel which, in such condition, is permitted to rotate in complete synchronism with the motor vehicle and assumes the value of 1 when the wheel is completely locked up.

The driving force $a$ varies with the slip ratio S in a manner that it peaks up at point P at which the slip ratio reaches a certain critical value which is indicated by $S_p$ and thereafter gradually declines as the slip ratio approaches the value of 1. The braking force $b$, on the other hand, increases abruptly until the critical slip ratio $S_p$ is reached as at point A and considerably slowly after such slip ratio has been reached. At points $K_a$ and $K_b$ of the curves $a$ and $b$, respectively, the braking force is greater than the driving force by an amount indicated by $l$ so that the vehicle wheels are caused to decelerate at a rate which is proportional to this amount of $l$. As a consequence, the slip ratio S increases as the braking fluid pressure in the wheel cylinders rises. When the slip ratio S becomes greater than the critical value $S_p$ at which the driving force resulting from the traction from the road surface peaks up, then the driving force diminishes as the slip ratio increases. As the slip ratio S increases, therefore, the difference between the driving and braking forces on the wheel becomes greater even though the braking fluid pressure is not increased. The wheel of the motor vehicle suddenly decelerates after the critical slip ratio $S_p$ is reached, thus tending to lock up. The region of the slip ratio between the values $S_p$ and 1 thus indicates a range of the operational condition in which the wheel is subject to the risk of being locked up.

It will be seen from the above discussion that the braking force should ideally be controlled in a manner that the slip ratio S remains substantially in the neighbourhood of the critical slip ratio $S_p$. Such control of the braking force will not only provide satisfactory maneuverability of the motor vehicle but enable the motor vehicle to be brought to a standstill in a satisfactorily shortened stopping distance.

Figure 2:
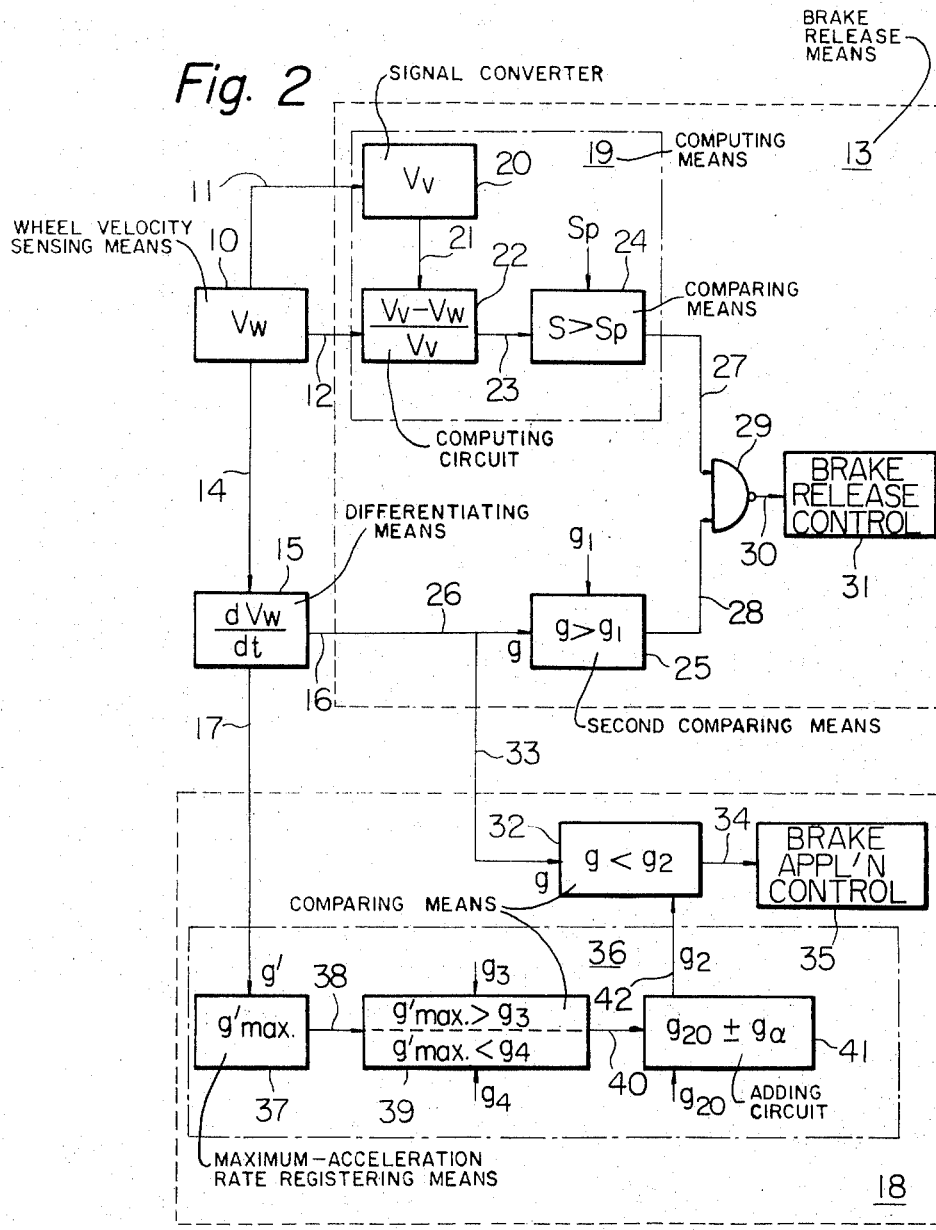
FIG. 2 is a block diagram illustrating a preferred embodiment of the skid control system according to the present invention.

A preferred embodiment of the skid control system according to the present invention which is operable to achieve the above described purpose is now illustrated in FIG. 2 in a block form.

The skid control system as shown includes wheel velocity sensing means 10 which is adapted to sense the velocity, such as the angular velocity, of the vehicle wheel on which the braking pressure is to be exerted during the braking operation. The sensing means 10 thus produces a wheel-velocity signal $V_w$ with a voltage substantially proportional to the velocity of the driving wheel. This wheel-velocity signal $V_w$ is delivered through lines 11 and 12 to brake release means 13 which is shown as enclosed within broken lines and through a line 14 to differentiating means 15. The differentiating means 15 is operable to differentiate the wheel-velocity signal $V_w$ with respect to time so as to deliver as an output a velocity-change-rate signal which is indicative of the rate of change of the wheel velocity sensed by the sensing means 10. The velocity-change-rate signal is thus an indicator of the rate of deceleration or acceleration of the driving wheel. The differentiating means 15 is connected through a line 16 to the brake release control means 13 and through a line 17 to brake application control means 18 which is also shown as enclosed within broken lines in FIG. 4.

The brake release control means 13 includes computing means 19 which is adapted to derive a slip-ratio signal from the wheel-velocity signal impressed thereupon through the lines 11 and 12, the computing means being shown as enclosed within dot-and-dash lines. The computing means 19 includes a signal converter 20 which has an input terminal connected to one output terminal of the wheel-velocity sensing means 10 through the line 11. This signal converter 20 is operable to deliver at its output terminal an approximated-vehicle-velocity signal through suitable modification of the wheel-velocity signal supplied from the sensing means 10. This approximated-vehicle-velocity signal may be obtained by the use of a decreasing ramp signal and the wheel-velocity signal, substantially in a manner as taught in the U.S. Pat. application by Ronald S. Scharlack, Ser. No. 854,876 filed Sept. 3, 1969. The signal thus appearing at an output terminal of the signal converter 20 has a characteristic which is hypothetically indicative of the velocity $V_v$ of the motor vehicle. The signal converter 20 is connected through a line 21 to an input terminal of a computing circuit 22 which has another input terminal connected to the wheel-velocity sensing means 10 through the line 12. This computing circuit 22 is a slip-ratio signal generator which provides a ratio of the difference between the approximated vehicle velocity $V_v$ and the sensed wheel velocity $V_w$ versus the approximated vehicle velocity $V_v$ so as to deliver at its output terminal a slip-ration signal S. The computing circuit 22 is connected through a line 23 to a comparing means 24 on which a signal representing a predetermined critical slip-ratio $S_p$ is constantly impressed as a slip-ratio reference signal. The slip-ratio signal supplied from the computing circuit 22 is thus compared with the predetermined slip-ratio reference signal in the comparing means 24 and delivers an output signal when the former is greater than the latter, hence $S>S_p$.

The brake release control means 13 further includes second comparing means 25 having an input terminal connected through a line 26 to one output terminal of the differentiating means 15 so as to receive therefrom the velocity-change-rate signal representing a deceleration rate $g$ of the wheel. On this second comparing means 25 is impressed a predetermined deceleration-rate reference signal $g_1$ with which the deceleration-rate signal supplied from the differentiating means 15 is compared to deliver an output signal when the latter is greater than the former, hence $g>g_1$. The first and second comparing means 24 and 25, respectively, are connected through lines 27 and 28 to an AND-gate circuit 29. This AND-gate circuit 29 is such that is produces a logical one output when the output signals from both the first and second comparing means 24 and 25, respectively, concurrently appear at the input terminals of the gate circuit. The AND-gate circuit 29 has its output terminal connected through a line 30 to a brake release control device 31 which is adapted to release or at least reduce the braking pressure on the driving wheel when actuated.

The brake application control means 18, on the other hand, includes comparing means 32 which has an input terminal connected to the line 26 interconnecting the differentiating means 15 and the second comparing means 25 of the brake release control means 13 so that the deceleration-rate signal $g$ is also fed to the comparing means 32 of the brake application control means 18. A variable deceleration-rate reference signal $g_2$ is impressed upon this comparing means 32 and is compared with the deceleration-rate signal $g$ supplied from the differentiating means 15. The comparing means 32 thus delivers an output signal when the deceleration-rate signal $g$ is smaller than the variable deceleration-rate reference signal $g_2$. The comparing means 32 is connected through a line 34 to a brake application control device 35 which is adapted to apply or re-apply the braking pressure to the driving wheel when actuated by the output signal from the comparing means 32, viz., when $g<g_2$.

The variable deceleration reference signal $g_2$ is adjusted and re-adjusted by computing means 36 in response to acceleration of the wheel in accordance with the velocity-change-rate signal from the differentiating means 15. This computing means 36 forms part of the brake application means 18 and is shown as enclosed within dot-and-dash lines in the lower part of FIG. 4.

The computing means 36 includes maximum-acceleration-rate registering means 37 which has an input terminal connected to the other output terminal of the differentiating means 15 through the line 17. This maximum-acceleration rate registering means 37 receives from the differentiating means 15 the velocity-change-rate signal representing an acceleration rate 8' of the wheel and thus registers a maximum value $g'_{max}$ of the acceleration rate in each of the brake application and re-application cycles. The maximum acceleration-rate registering means 37 has an output terminal connected through a line 38 to an input terminal of comparing means 39 on which two predetermined acceleration-rate reference signals $g_3$ and $g_4$ are impressed where $g_3<g_4$. These acceleration-rate reference signals $g_3$ and $g_4$ are compared with the maximum-acceleration-rate signal $g'_{max}$ whereupon a positive control signal $g_\alpha$ is delivered from the comparing means 39 if the maximum-acceleration-rate signal $g_{max}$ is greater than the reference signal $g_3$ and a negative control signal $-g_\alpha$ is delivered if the maximum-acceleration-rate signal $g'_{max}$ is smaller than the other reference signal $g_4$. The comparing means 39, in turn, has an output terminal which is connected through a line 40 to an adding circuit 41 on which a suitable bias signal $g_{20}$ is impressed. This bias signal $g_{20}$ may be of a predetermined constant voltage or, if preferred, may be the variable deceleration-rate signal $g_2$ appearing in the preceding brake application cycle, as will be described later. The positive or negative control signal $g_\alpha$ or $-g_\alpha$ issuing from the comparing means 39 is "added" to the bias signal $g_{20}$ in the adding circuit 41 with the result that an output signal with a varied magnitude is delivered therefrom depending upon the level of the maximum acceleration-rate signal $g'_{max}$ supplied to the comparing means 39. The adding circuit 41 has an output terminal connected to the comparing means 32 through a line 42 so that the "sum" of the bias signal $g_{20}$ and the positive or negative control signal $g_\alpha$ or $-g_\alpha$, respectively, is impressed on the comparing means 32 as the variable deceleration-rate signal $g_2$.

The operation of the skid control system shown in FIG. 2 will now be described with reference to FIGS. 3A and 3B.

Figure 3A:
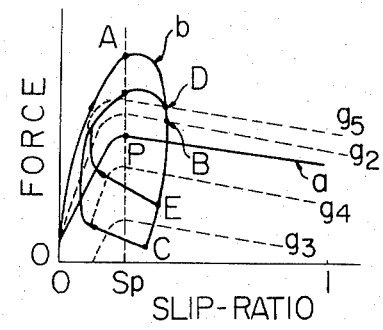
FIGS. 3A and 3B are similar to FIG. 1 but show variations in the driving and braking forces on a motor vehicle incorporating the skid control system shown in FIG. 2.

When the driver jams on the brakes violently at a considerably high driving speed of the motor vehicle, the braking force on the driving wheel increases abruptly at an initial stage of the brake application as indicated by curve $b$ of FIG. 3A. At an instant the driving force peaks up at point A, the deceleration rate $g$ of the wheel is greater than the predetermined limit $g_1$ and, at the same time, the slip ratio S exceeds the predetermined critical slip ratio $S_p$. Under this condition, both the comparing means 24 and 25 deliver the outputs so that the AND-gate circuit 29 actuates the brake release control device 31. The braking pressure on the wheel consequently decreases until the deceleration rate $g$ becomes lower than the predetermined deceleration rate $g_1$ so as to cause the brake release control device 31 to be inoperative. When the deceleration rate $g$ becomes lower than the variable deceleration rate $g_2$, then the comparator 32 delivers the output signal to actuate the brake application control device 35 at point B of the curve $b$ of FIG. 3A. In this instance, the braking pressure commences to rise actually at point C of the curve $b$ as indicated by an arrow, on account of a sizeable time lag. This point C is herein referred to as the braking pressure recovery point. With the braking pressure thus increasing from point C, the acceleration rate $g'$ of the driving wheel is determined by the difference between the driving force $a$ and braking force $b$. This will mean that, if the braking pressure recovery point C is located too low in the graph of FIG. 3A, viz., if the braking force is reduced to an excessively low level, than an excessive increase in the difference between the driving and braking forces $a$ and $b$, respectively, will result. As a consequence, the acceleration rate $g$ of the driving wheel will exceed the predetermined value $g_3$ during the acceleration condition of the vehicle wheel. The comparing means 39 thus responds to such condition and delivers the positive control signal of $g_\alpha$ to the adding circuit 41 with the result that the deceleration-rate reference signal $g_2$ is increased by the amount of $g_\alpha$. The comparing means 32 of the brake application control means 18 is consequently caused to deliver the output signal at point D of the curve $b$ of FIG. 3A and, by reason of the time lag as above mentioned, the braking pressure on the driving wheel starts at point E which is higher than the point C. This prevents the slip ratio from lowering excessively so that the motor vehicle can be brought to rest in a shortened distance.

Figure 3B:
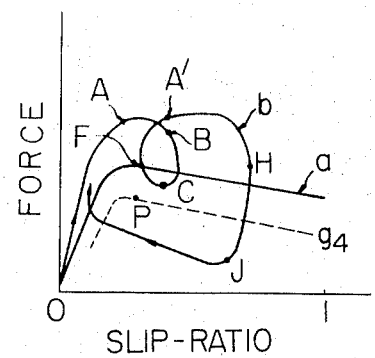

In the event the braking pressure recovery point C fails to lower to a reasonable extent, the braking force $b$ will reach a level in the vicinity of point E which is located in the dangerous region within which the slip ratio S intervenes between $S_p$ and 1 as indicated in FIG. 3B, with the result that the vehicle wheel tends to be readily locked up. Under this condition in which the wheel is still accelerating, the difference between the driving and braking forces $a$ and $b$, respectively, is so small that the acceleration rate of the driving wheel is limited to such an extent as to be short of the predetermined acceleration-rate reference signal $g_4$, hence $g<g_4$. The comparing means 39 thus responds to such condition so as to deliver the negative control signal $-g_\alpha$, thereby reducing the variable deceleration-rate reference signal $g_2$. It therefore follows that the comparing means 32 actuates the brake application control device 35 at point H of the curve $b$ of FIG. 3B so that the braking pressure which has been reduced from point A' starts to increase at point J which is lower than the point C. As a consequence, the curve $b$ representing the braking force on the wheel is permitted to enter the safety region within which the slip ratio is smaller than $S_p$.

Figure 4A:
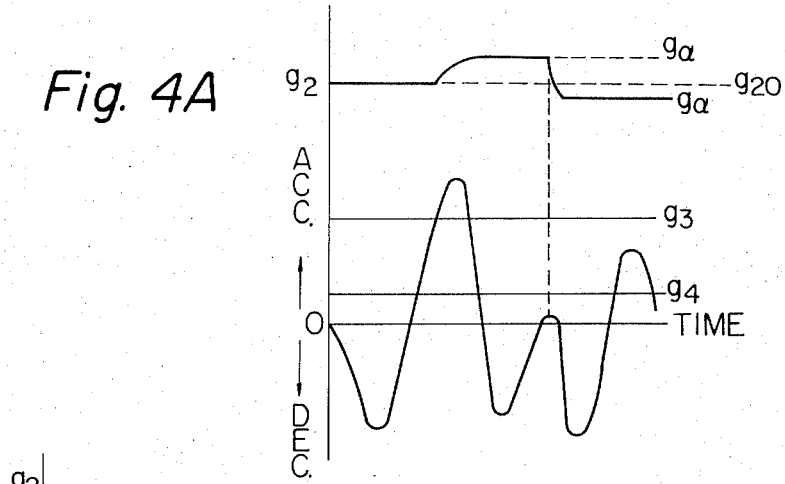
FIGS. 4A, 4B and 4C are graphs illustrating manners for forming the waveforms of the variable deceleration-rate reference signal in the method according to the present invention.
Figure 4B:
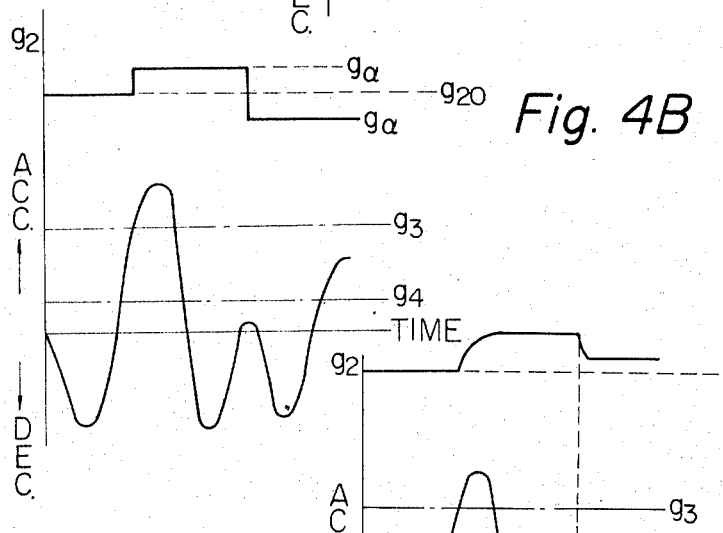
Figure 4C:
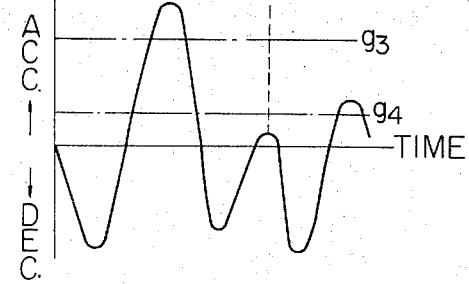

FIGS. 4A to 4C indicate preferred manners of forming the variable deceleration-rate reference signal in the method according to the present invention. In the manner illustrated in FIG. 4A, the positive control signal $g_\alpha$ is produced with a voltage substantially proportional to an increment of the acceleration rate of the vehicle wheel over the predetermined acceleration-rate reference signal $g_3$, while the negative control signal $-g_\alpha$ is produced with a minus voltage substantially proportional to a decrement of the acceleration-rate below the predetermined acceleration-rate reference signal $g_4$. Thus, the variable deceleration-rate reference signal $g_2$ may be of a negative value representing an acceleration condition through suitable selection of the bias signal $g_2$. In contrast to the manner shown in FIG. 4A in which the control signal is formed in an analog fashion, the positive and negative control signals $g_\alpha$ and $-g_\alpha$ may be formed in a digital fashion, having predetermined constant values as seen in FIG. 4B. Or otherwise, the bias voltage $g_{20}$ may be provided through utilization of the variable deceleration-rate reference signal $g_{20}$ formed in the preceding brake application cycle, as seen in FIG. 4C.

It will now be appreciated from the foregoing description that, since the changes in the wheel and road surface conditions in the preceding operational cycle are "fed back" to the skid control system in each of the brake release and application cycles, the brake recovery point can be controlled depending upon such changes in the wheel and road surface condition if such point lies in a range in which the wheel is subject to lock-up condition. By reason of such satisfactory adaptability to the changes in the operational conditions of the motor vehicle, the skid control system according to the present invention is advantageous for the prevention of the lock-up of the wheel or wheels of the motor vehicle and for minimizing the stopping distance of the motor vehicle during the braking operation.

What is claimed is:

1. A method for controlling the application and release of braking pressure on at least one wheel of a motor vehicle during braking operation, comprising sensing the velocity of the wheel for producing a wheel-velocity signal, deriving from this wheel-velocity signal a slip-ratio signal representing a ratio of an amount of slippage of the wheel on the road surface vs an approximated vehicle speed and a velocity-change-rate signal indicative of the rate of change of the sensed wheel-velocity, releasing the braking pressure from the wheel when said slip-ratio signal exceeds a predetermined slip-ratio reference signal and concurrently when said velocity-change-rate signal exceeds a predetermined deceleration-rate reference signal, applying the braking pressure to the wheel when the velocity-change rate signal is smaller than a variable deceleration-rate reference signal, varying said variable deceleration-rate reference signal in accordance with said velocity change-rate signal in response to acceleration of the wheel, deriving a maximum-acceleration-rate signal from said velocity-change-rate signal and comparing the maximum-acceleration-rate signal with two different acceleration-rate reference signals for producing a control signal by which said variable deceleration-rate reference signal is increased when said maximum-acceleration-rate signal is greater than the greater one of said acceleration-rate reference signals and decreased when the maximum-acceleration-rate signal is smaller than the smaller one of the acceleration-rate reference signals.

2. A method as set forth in claim 1, further comprising deriving an approximated-vehicle-velocity signal from said wheel-velocity signal for producing said slip-ratio signal, said slip-ratio signal representing a ratio of a difference between said approximated-vehicle-velocity signal and wheel-velocity signal vs. the approximated-vehicle-velocity signal.

3. A method as set forth in claim 1, in which said velocity-change-rate signal is produced by differentiating said wheel-velocity signal with respect to time.

4. A method as set forth in claim 1, further comprising producing a positive control signal when said maximum-acceleration-rate signal is greater than said greater one of said acceleration-rate reference signals or a negative control signal when the maximum-acceleration-rate signal is smaller than said smaller one of the acceleration-rate-reference signals, and adding said positive or negative control signal to a bias signal for forming said variable deceleration-rate-reference signal.

5. A method as set forth in claim 4, in which said bias signal is the variable deceleration-rate signal formed in the preceding brake application cycle.

6. A method as set forth in claim 4, in which said positive and negative control signals have predetermined constant plus and minus magnitudes, respectively.

7. A method as set forth in claim 4, in which said positive control signal has a plus magnitude which is substantially proportional to an increment of said maximum-acceleration-rate signal from said greater one of said acceleration-rate-reference signals and said negative control signal has a minus magnitude which is substantially proportional to a decrement of said maximum-acceleration-rate signal from said smaller one of said acceleration-rate reference signals.

8. In a skid control system for controlling the release and application of braking pressure on at least one wheel of a motor vehicle during braking operation, the improvement comprising sensing means for sensing the velocity of the vehicle producing a wheel-velocity signal, differentiating means for differentiating said wheel-velocity signal with respect to time and producing a velocity-change-rate signal which is indicative of the rate of change of the sensed wheel velocity, brake release means including first computing means for deriving from said wheel-velocity signal a slip-ratio signal representing a ratio of an amount of slippage of the wheel on a road surface vs. an approximated-vehicle-velocity, said brake release means being operable to release the braking pressure from the driving wheel when said slip-ratio signal exceeds a predetermined slip-ratio reference signal and concurrently when said velocity-change-rate signal is greater than a predetermined deceleration-rate reference signal, and brake application control means for applying the braking pressure to the wheel when the velocity-change-rate signal is smaller than a variable deceleration-rate reference signal, said brake application control means comprising second computing means for varying said variable deceleration-rate reference signal in accordance with said velocity-change-rate signal in response to acceleration of the wheel, in which said brake application control means further comprises first comparing means for comparing said velocity-change-rate signal with said variable deceleration-rate reference signal and producing an output signal when the former signal is smaller than the latter signal and a brake application device connected to an output terminal of said comparing means for applying the braking pressure to the driving wheel when receiving the output signal from the comparing means, and in which said computing means of said brake application control means comprises a maximum-acceleration-rate registering means for registering a maximum acceleration rate from said velocity-change-rate signal and producing a maximum-acceleration rate signal in each of the brake application cycles, and comparing means for comparing the maximum-acceleration-rate signal with first and second acceleration-rate reference signals having greater and smaller magnitudes respectively and producing a control signal by which said variable deceleration-rate reference signal is increased when the maximum-acceleration-rate signal is greater than said first acceleration-rate reference signal or decreased when the maximum-acceleration-rate signal is smaller than said second acceleration-rate reference signal.

9. The improvement as set forth in claim 8, in which said computing means of said brake release control means comprises a signal converter for converting said wheel-velocity signal into an approximated-vehicle-velocity signal, a computing circuit for producing said slip-ratio signal from said wheel-velocity and approximated-velocity signals, and first comparing means for comparing the slip-ratio signal with said predetermined slip-ratio reference signal and producing an output signal when the former signal is greater than the latter signal.

10. The improvement as set forth in claim 9, in which said brake release control means further comprising second comparing means for comparing said velocity-change-rate signal with said predetermined deceleration-rate signal for producing an output signal when the former signal is greater than the latter signal.

11. The improvement as set forth in claim 10, in which said brake control means further comprises an AND-gate circuit which is connected to output terminals of said first and second comparing means and producing an output signal when receiving both of the output signals from the first and second comparing means and a brake release control device connected to an output terminal of said AND-gate circuit for releasing the braking pressure from the driving wheel when actuated by said AND-gate circuit.

12. The improvement as set forth in claim 8, in which said computing means of the brake application control means further comprises an adding circuit which is biased with a bias signal for adding said control signal to said bias signal to form said variable deceleration-rate reference signal.

* * * * *